(12) United States Patent
Scanlon et al.

(10) Patent No.: US 11,553,821 B2
(45) Date of Patent: Jan. 17, 2023

(54) SHOWER CURTAIN CLIPS

(71) Applicant: Decolin Inc., Montreal (CA)

(72) Inventors: Benjamin Scanlon, Philadelphia, PA (US); Adam T. Emenecker, Blackwood, NJ (US)

(73) Assignee: Decolin Inc., Montreal (CA)

( * ) Notice: Subject to any disclaimer, the term of this patent is extended or adjusted under 35 U.S.C. 154(b) by 0 days.

(21) Appl. No.: 17/200,192

(22) Filed: Mar. 12, 2021

(65) Prior Publication Data

US 2021/0369058 A1 Dec. 2, 2021

Related U.S. Application Data

(60) Provisional application No. 62/988,981, filed on Mar. 13, 2020.

(51) Int. Cl.
*A47K 3/38* (2006.01)

(52) U.S. Cl.
CPC ..................................... *A47K 3/38* (2013.01)

(58) Field of Classification Search
CPC ..................................................... A47K 3/38
USPC .............................. 4/610, 605, 612, 596, 614
See application file for complete search history.

(56) References Cited

U.S. PATENT DOCUMENTS

| | | | |
|---|---|---|---|
| 4,279,396 A * | 7/1981 | Bendock | A47K 3/38 24/530 |
| 4,759,087 A | 7/1988 | Zeilinger | |
| 4,887,324 A * | 12/1989 | Cairns | A47K 3/38 4/609 |
| D307,108 S * | 4/1990 | Morita | D13/154 |
| 4,943,024 A * | 7/1990 | Meyer | A47F 7/147 24/547 |
| 5,109,576 A * | 5/1992 | Teekell | B65D 33/1675 24/30.5 R |
| 5,159,730 A * | 11/1992 | Radvin | A44B 99/00 24/543 |
| D351,519 S * | 10/1994 | De Marco | D6/513 |
| D374,170 S * | 10/1996 | Slaski | D32/61 |
| 5,617,616 A * | 4/1997 | Cutts, Sr. | A61F 5/4407 24/30.5 R |
| 5,653,414 A * | 8/1997 | Chimel | G02C 11/00 248/316.7 |
| 5,787,954 A * | 8/1998 | Herrera | A47K 3/38 16/87.2 |
| 5,895,018 A * | 4/1999 | Rielo | A47K 10/12 248/206.5 |
| D417,136 S * | 11/1999 | Jackovin | D8/356 |
| 6,027,091 A | 2/2000 | Johnson | |
| D464,238 S * | 10/2002 | Kelly-Lindsey | D8/16 |

(Continued)

OTHER PUBLICATIONS

The International Search Report and the Written Opinion of the International Searching Authority for International Application No. PCT/CA2021/050335, 10 pages.

*Primary Examiner* — Lori L Baker
(74) *Attorney, Agent, or Firm* — Alan G. Towner; Leech Tishman Fuscaldo & Lampl

(57) ABSTRACT

Shower curtain clips that hold shower curtains against bath walls to reduce drafts and escape of water spray during use. The shower curtain clips include a base panel that can be mounted on a bath wall, and a pivoting retaining panel that can be opened to receive a shower curtain and closed to secure the shower curtain in place.

10 Claims, 5 Drawing Sheets

(56) References Cited

U.S. PATENT DOCUMENTS

| | | | | |
|---|---|---|---|---|
| 6,474,609 B1* | 11/2002 | Pinard | | A47H 1/18 |
| | | | | 160/348 |
| 6,484,788 B1* | 11/2002 | Jerrell | | A47H 13/02 |
| | | | | 16/87.2 |
| D618,537 S* | 6/2010 | Panzer | | D8/367 |
| 8,297,576 B2* | 10/2012 | McLeod | | A47G 1/16 |
| | | | | 248/257 |
| 9,351,528 B2* | 5/2016 | Grimes | | A41F 17/02 |
| D766,601 S* | 9/2016 | Barre | | D6/326 |
| 9,474,336 B2* | 10/2016 | Fathi | | A44B 15/005 |
| 9,587,659 B1* | 3/2017 | D'Artell | | D06F 55/00 |
| D793,476 S* | 8/2017 | Tolokan | | D19/34 |
| D811,638 S* | 2/2018 | Chang | | D26/51 |
| D881,684 S* | 4/2020 | Yoshikawa | | D8/395 |
| 10,683,602 B1* | 6/2020 | Henry | | F16B 2/10 |
| D891,910 S* | 8/2020 | Rosa | | D8/367 |
| D902,025 S* | 11/2020 | Beck | | D8/395 |
| 11,026,546 B1* | 6/2021 | Broussard | | A47K 3/38 |
| 2005/0028330 A1* | 2/2005 | Hsu | | A47K 3/38 |
| | | | | 24/555 |
| 2005/0067444 A1* | 3/2005 | Whitby | | A47G 25/32 |
| | | | | 223/85 |
| 2005/0286886 A1* | 12/2005 | Koziak | | A47H 19/00 |
| | | | | 396/318 |
| 2007/0007313 A1* | 1/2007 | Shimizu | | A47G 25/483 |
| | | | | 223/85 |
| 2008/0011434 A1* | 1/2008 | Tascoe | | A47H 23/04 |
| | | | | 160/349.2 |
| 2008/0178423 A1* | 7/2008 | Patel | | A47H 13/14 |
| | | | | 16/87.2 |
| 2010/0038506 A1* | 2/2010 | King, Jr. | | F16L 3/133 |
| | | | | 248/230.7 |
| 2011/0073727 A1* | 3/2011 | Koziak | | A47H 19/00 |
| | | | | 248/205.1 |
| 2012/0273640 A1* | 11/2012 | Fathi | | A47G 29/083 |
| | | | | 248/316.5 |
| 2015/0074961 A1* | 3/2015 | Glaze | | A47H 15/04 |
| | | | | 24/716 |
| 2015/0115115 A1* | 4/2015 | Rocke | | F16B 5/0692 |
| | | | | 248/201 |
| 2017/0265665 A1* | 9/2017 | Wright | | F16B 2/005 |
| 2018/0295433 A1* | 10/2018 | Fustino | | H04R 1/026 |

* cited by examiner

SHOWER CURTAIN CLIPS

CROSS-REFERENCE TO RELATED APPLICATION

This application claims the benefit of U.S. Provisional Patent Application No. 62/988,981 filed Mar. 13, 2020, which is incorporated herein by reference.

FIELD OF THE INVENTION

The present invention relates to shower curtain clips that can be mounted on bath walls to hold shower curtains and liners in place.

BACKGROUND INFORMATION

Shower curtains often allow gaps against bath walls that cause drafts and can allow water spray to escape. The present invention provides shower curtain clips that overcome these problems.

SUMMARY OF THE INVENTION

The present invention provides shower curtain clips that hold shower curtains and/or liners against bath walls to reduce drafts and escape of water spray during use. The shower curtain clips include a base panel that can be mounted on a bath wall, and a pivoting retaining panel that can be opened to receive a shower curtain and closed to secure the shower curtain in place.

An aspect of the present invention is to provide a shower curtain clip comprising: a base panel structured and arranged for mounting on a bath wall comprising a rear base face, a curtain-engaging front face at least partially coextensive with the rear base face, and a curtain-engaging nose surface extending between the rear base face and the curtain-engaging front face; and a retaining panel pivotally attached to the base panel comprising a curtain-engaging rear face and a retaining end including a curtain-engaging inner surface extending from the curtain-engaging rear face and terminating at a snap edge, wherein, when the shower curtain clip is in a closed position, the curtain-engaging front face of the base panel faces and forms a first curtain-engaging region with the curtain-engaging rear face of the retaining panel, and the curtain-engaging nose surface of the base panel faces and forms a second curtain-engaging region with the curtain-engaging inner surface of the retaining panel.

This and other aspects of the present invention will be more apparent from the following description.

DETAILED DESCRIPTION

Figure 1:
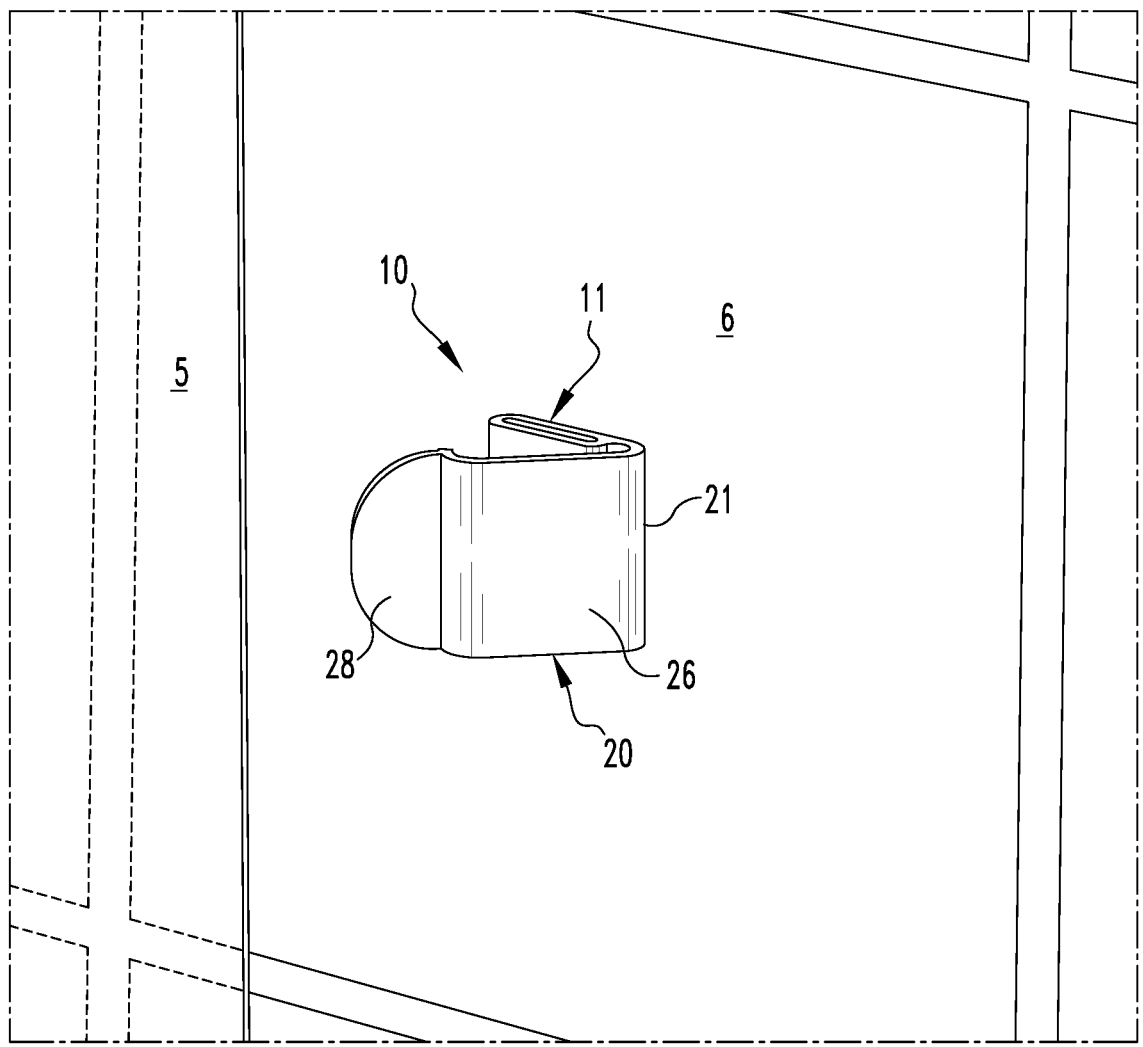
FIG. 1 illustrates a shower curtain clip for securing a shower curtain liner against a wall of the shower or bath.
Figure 2:
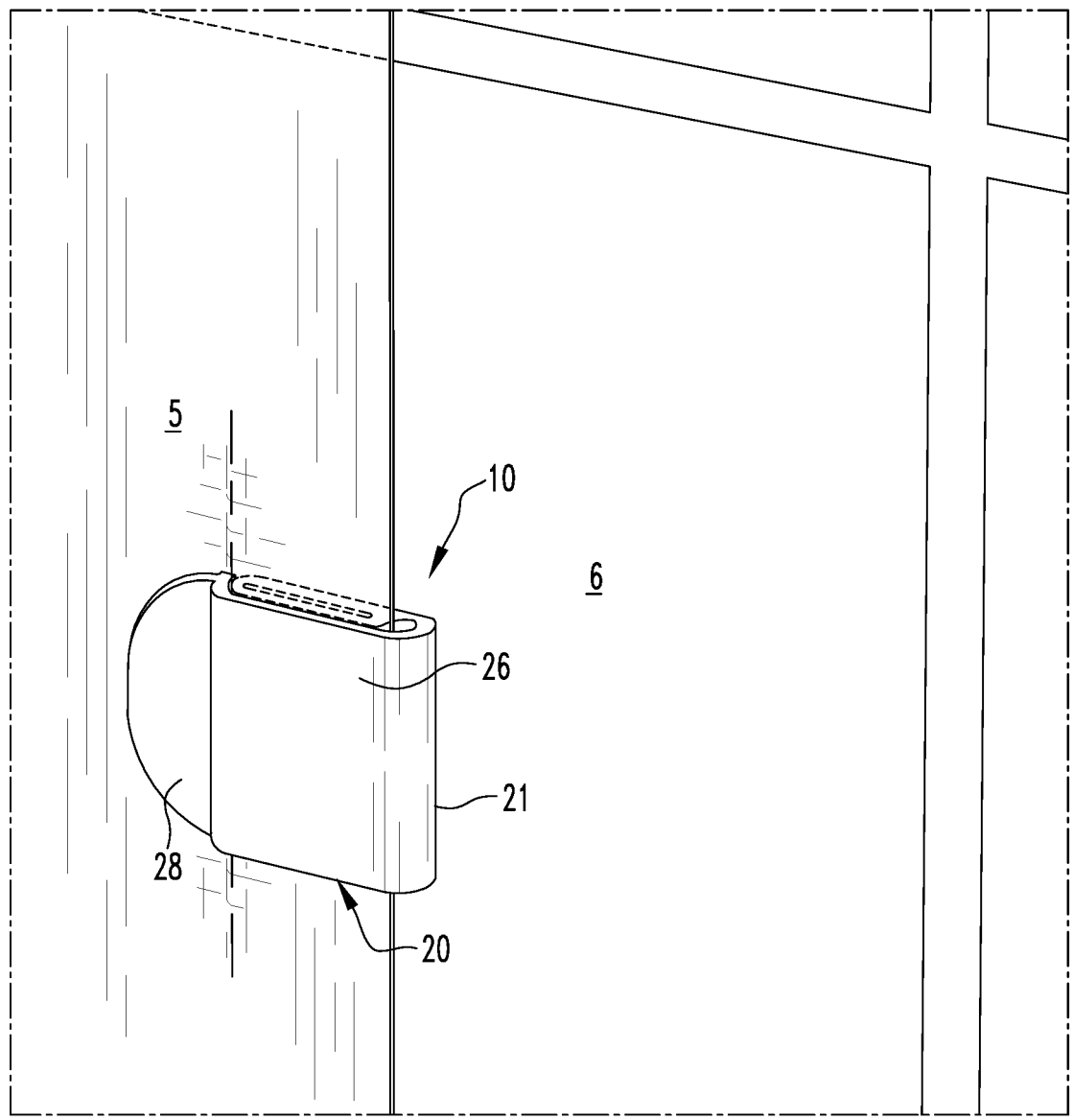
FIG. 2 illustrates the shower curtain clip of FIG. 1 in a closed or clipped position in which the shower curtain liner is held next to the shower wall.
Figure 3:
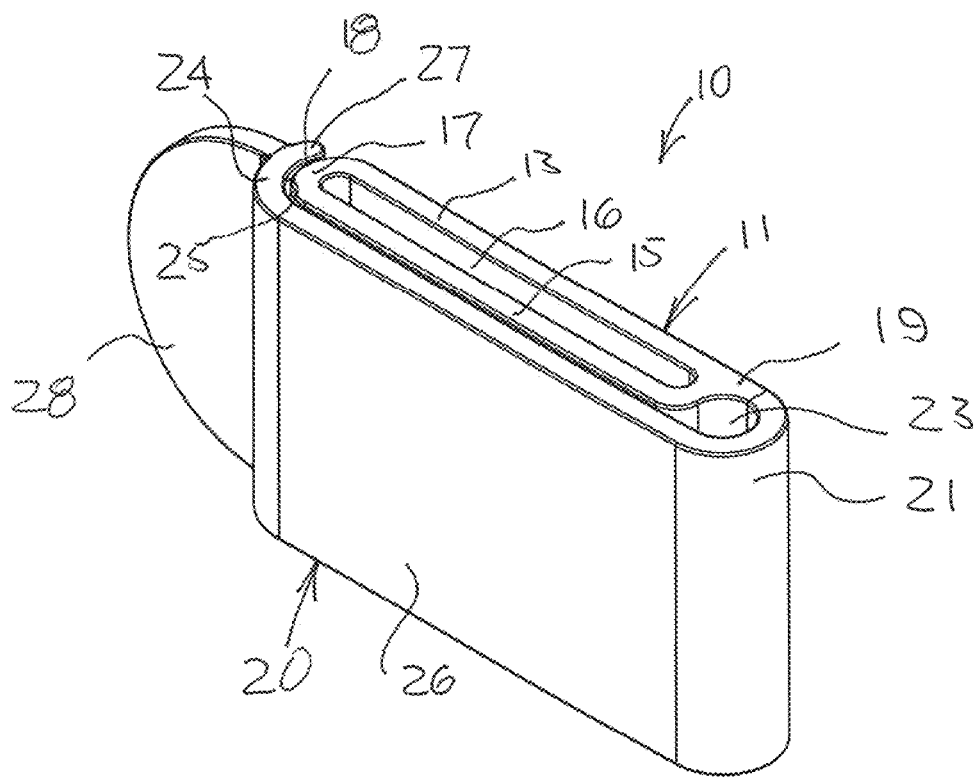
FIG. 3 is a top front isometric view of the shower curtain clip in a closed position.
Figure 4:
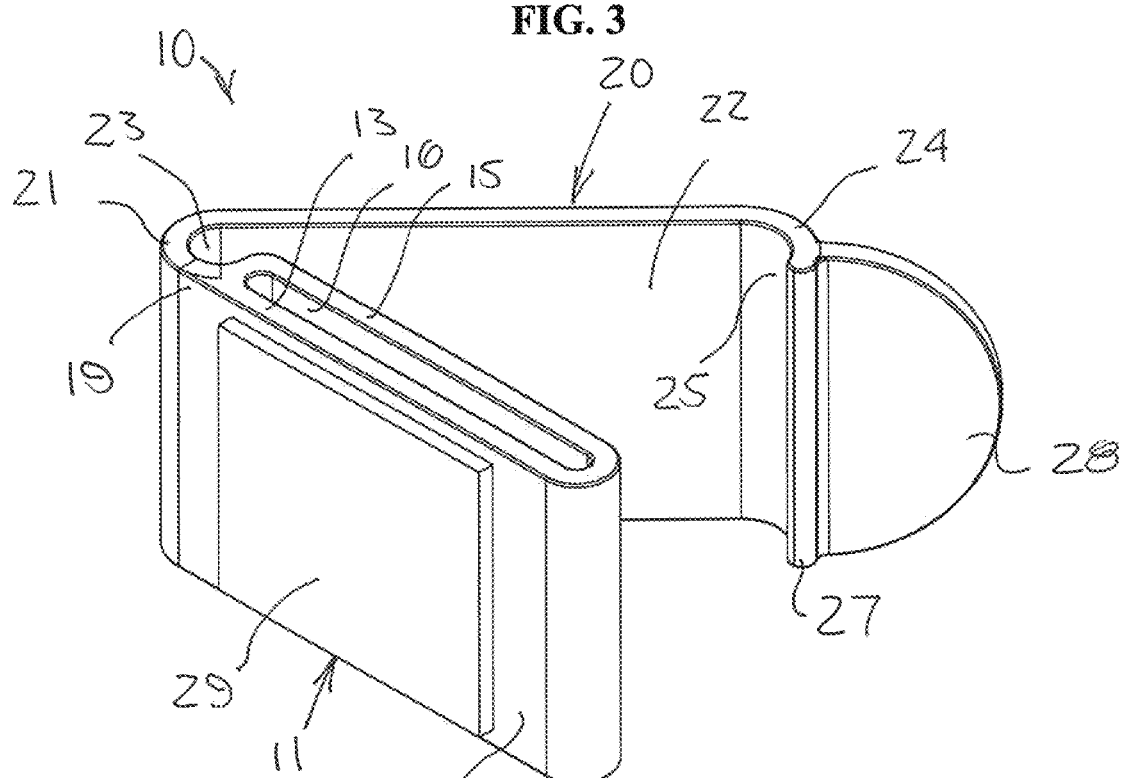
FIG. 4 is a top rear isometric view of the shower curtain clip of FIG. 3 in an open position.
Figures 5, 6:
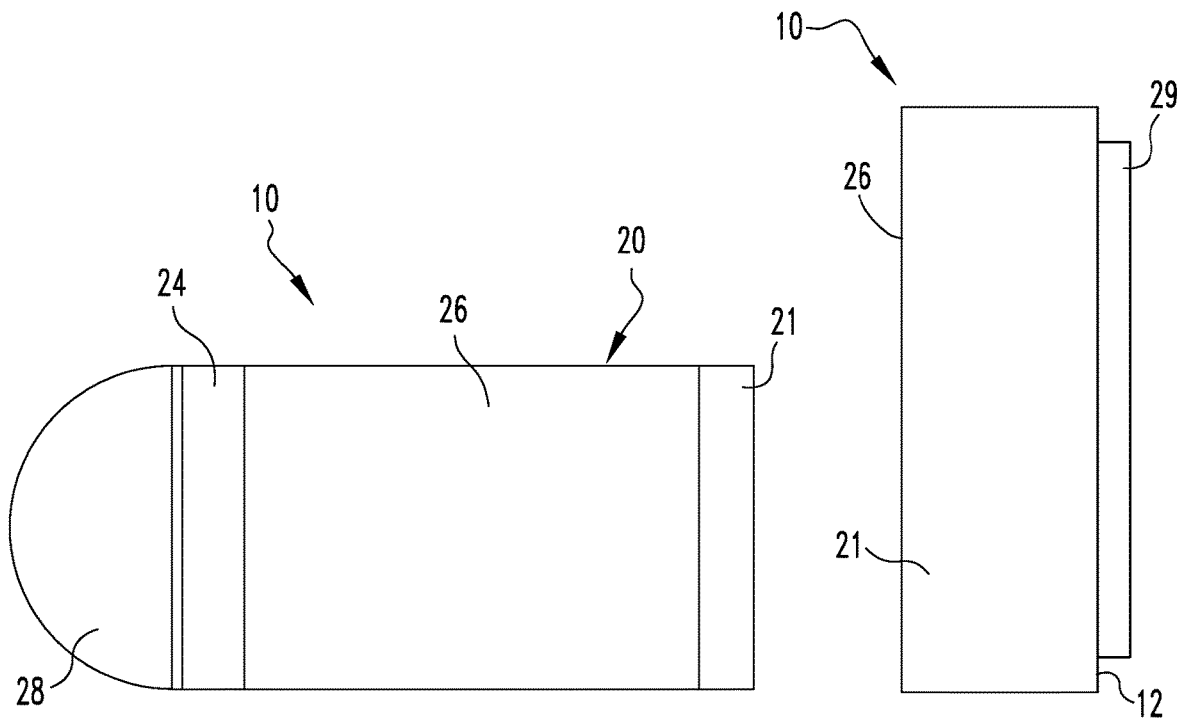
FIGS. 5, 6 and 7 are front, side and top views, respectively, of the shower curtain clip of FIG. 3

FIGS. 1 and 2 illustrate a shower curtain clip 10 of the present invention mounted on a bath wall 6 for securing a shower curtain 5. As used herein, the term "shower curtain clip" includes both curtains and liners that are used in showers and/or bathtubs. The shower curtain clip 10 includes a base panel 11 that may be mounted on the bath wall 6 and a pivoting retaining panel 20 that may be used to clamp or secure the shower curtain 5 against the bath wall 6. In FIG. 1, the retaining panel 20 is pivoted to an open position for receiving the shower curtain 5. In FIG. 2, the retaining panel 20 is in a closed position with the shower curtain 5 secured within the shower curtain clip 10. Drafts inside the shower/bath stall are reduced by holding the shower curtain 5 close to the wall 6, and escape of water spray outside the stall may also be reduced.

As shown in FIGS. 1-7, the shower curtain clip 10 includes a base panel 11 having a rear wall 13, front wall 15 and channel 16 therebetween. The base panel 11 has a rear face 12 and a front face 14. The front face 14 engages the shower curtain 5 and includes a planar surface that is parallel with the rear face 12 and at least partially coextensive therewith. The base panel 11 includes a retaining nose 17 integrally formed with the rear wall 13 and front wall 15. The retaining nose 17 includes a curtain-engaging nose surface 18 oriented transverse to the plane of the curtain engaging front face 14 of the base panel 11. In the embodiment shown, the retaining nose 17 has a generally cylindrical shape. The base panel 11 has a hinge edge 19 at the opposite end from the retaining nose 17.

The pivoting retaining panel 20 is attached to the base panel 11 by a living hinge 21 that enables the retaining panel 20 to be pivoted from open and closed positions as shown in FIGS. 1 and 2. In the embodiment shown, the living hinge 21 is integrally formed with the rear wall 13 of the base panel 11 and the wall of the retaining panel 20. However, any other suitable type of hinge or pivoting mechanism may be used.

Figure 7:
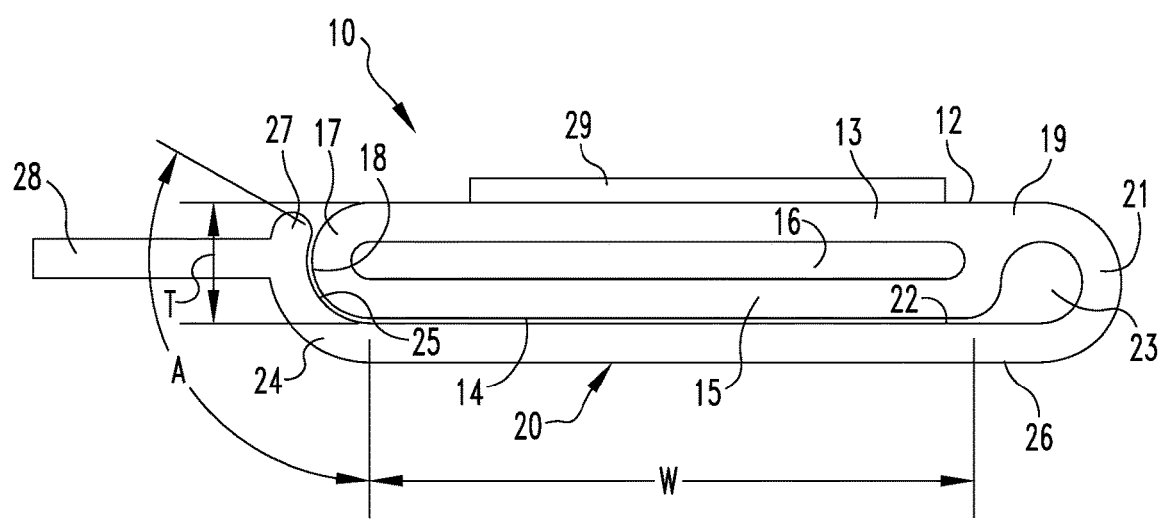

The retaining panel 20 includes a curtain-engaging rear face 22 and an outer surface 26. A pivot space 23 is provided in the region of the living hinge 21, which facilitates operation of the living hinge 21 and may also serve to contain an edge of the shower curtain 5 when the shower curtain clip 10 is in its closed position. The retaining panel 20 includes a retaining end 24 having a curtain-engaging inner surface 25. The inner surface 25 has a generally cylindrical shape that conforms with the generally cylindrical shape of the retaining nose 17. The retaining end 24 of the retaining panel 20 terminates at a snap edge 27, which holds or biases the retaining panel 20 in its closed position, as shown in FIG. 7. A finger tab 28 is provided at the end of the retaining panel 20 opposite the living hinge 21.

As shown in FIGS. 1-8, the front retaining panel 20 of the shower curtain clip 10 may be single-walled, while the rear base panel 11 may be double-walled with a space 16 provided between the walls 13 and 15 to add more thickness to the rear base panel 11, and to increase the edge radius of the retaining nose 17 for releasable engagement of the rear base panel 11 with the snap feature 27 of the front retaining panel 20.

As shown in FIG. 7, the base panel 11 has a thickness T measured in a direction perpendicular to the rear face 12. The base panel thickness T may be greater than the wall thickness of the front retaining panel 20, for example, at least 100 percent greater, or at least 200 percent greater, or at least 300 percent greater. The curtain-engaging front face 14 of the base panel 11 has a width W measured in a plane parallel with the rear face 12. The curtain-engaging nose surface 18 of the base panel 11 faces the curtain-engaging inner surface 25 of the retaining panel 20 to form a region therebetween having an arc distance A. The ratio T:W of the base panel thickness to curtain-engaging front face width may typically range from 0.05:1 to 0.5:1, for example, from 0.1:1 to 0.3:1, or from 0.15:1 to 0.25:1. The ratio A:W of the arc distance to curtain-engaging front face width may typically have a ratio A:W of from 0.05:1 to 0.5:1, for example, from 0.1:1 to 0.3:1, or from 0.15:1 to 0.25:1. The ratio A:T of the arc distance to base panel thickness may typically range from 0.5:1 to 2:1, for example, from 0.6:1 to 1.8:1, or from 0.8:1 to 1.5:1. The arc distance A may be greater than the thickness T in some embodiments.

The shower curtain clip 10 may be made of any suitable material including plastics such as polypropylene, nylon, and the like. The clip 10 may be manufactured by any suitable methods such as injection molding, extruding and the like.

Figure 8:
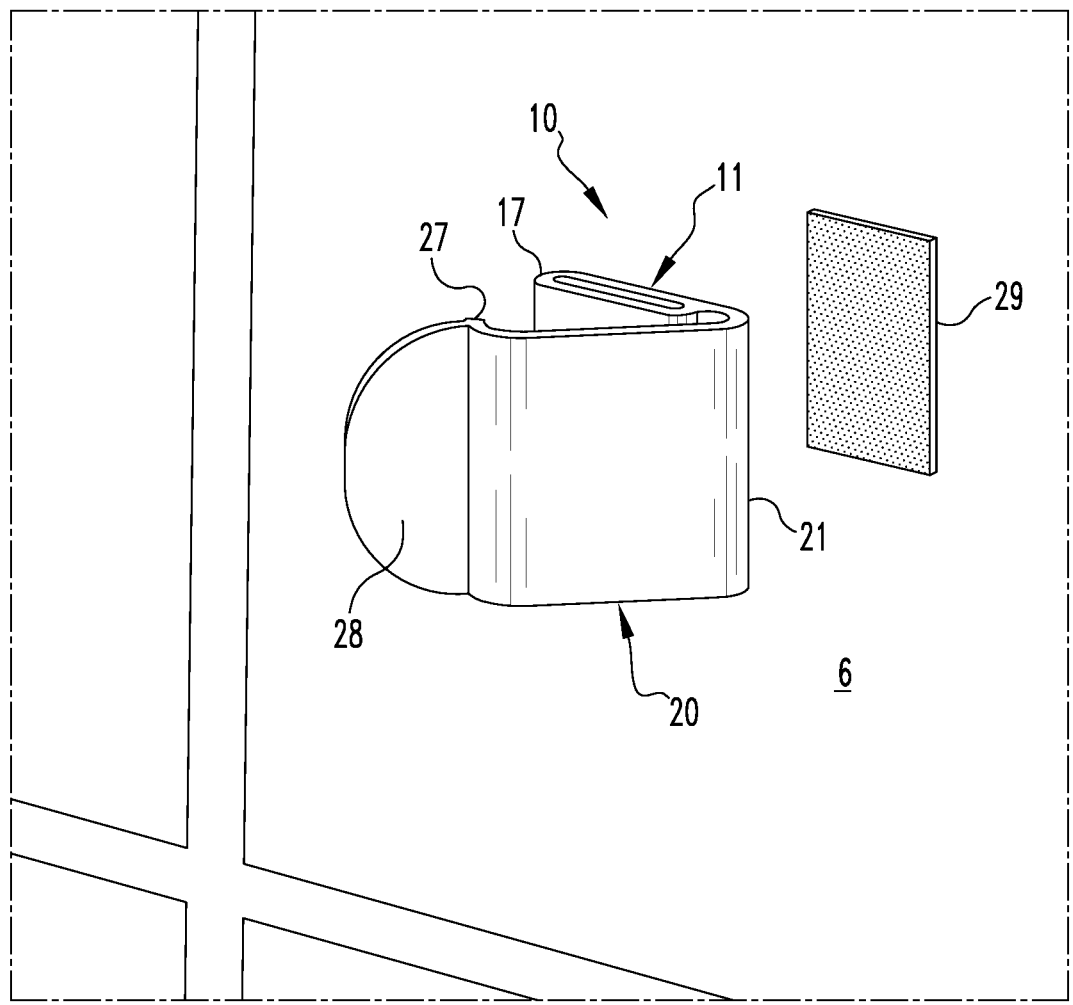
FIG. 8 illustrates the installation of the shower curtain clip on a shower wall.

FIG. 8 illustrates the installation of a shower curtain clip 10 on a bath wall 6. The adhesive strip or pad 29 is used to attach and secure the rear face 12 of the clip 10 to the wall 6. The adhesive strip 29 may include a pressure-sensitive adhesive on its rear face, which may be covered with a release layer that can be peeled away prior to installation. The front face of the adhesive strip may include a releasable or permanent adhesive layer. The strip may be made of foam or any other suitable material to allow for improved adherence to textured or irregular wall surfaces.

As used herein, "including," "containing" and like terms are understood in the context of this application to be synonymous with "comprising" and are therefore open-ended and do not exclude the presence of additional undescribed or unrecited elements, materials, phases or method steps. As used herein, "consisting of" is understood in the context of this application to exclude the presence of any unspecified element, material, phase or method step. As used herein, "consisting essentially of" is understood in the context of this application to include the specified elements, materials, phases, or method steps, where applicable, and to also include any unspecified elements, materials, phases, or method steps that do not materially affect the basic or novel characteristics of the invention.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. In this application and the appended claims, the articles "a," "an," and "the" include plural referents unless expressly and unequivocally limited to one referent.

Whereas particular embodiments of this invention have been described above for purposes of illustration, it will be evident to those skilled in the art that numerous variations of the details of the present invention may be made without departing from the invention as defined in the appended claims.

What is claimed is:

1. A shower curtain clip comprising:
   a base panel structured and arranged for mounting on a bath wall comprising a rear base face, a curtain-engaging front face comprising a planar surface at least partially coextensive with the rear base face, and a curtain-engaging nose surface extending between the rear base face and the curtain-engaging front face; and
   a retaining panel pivotally attached to the base panel comprising a curtain-engaging rear face comprising a planar surface and a retaining end including a curtain-engaging inner surface extending from the curtain-engaging rear face and terminating at a snap edge,
   wherein, when the shower curtain clip is in a closed position, the curtain-engaging front face of the base panel faces and forms a first curtain-engaging region with the curtain-engaging rear face of the retaining panel, and the curtain-engaging nose surface of the base panel faces and forms a second curtain-engaging region with the curtain-engaging inner surface of the retaining panel.

2. The shower curtain clip of claim 1, wherein the snap edge of the retaining panel is structured and arranged to elastically deform and snap over the curtain-engaging nose surface of the base panel when the retaining panel is pivoted from an open position to the closed position to thereby releasingly hold the retaining panel in the closed position.

3. The shower curtain clip of claim 1, wherein the retaining panel is pivotally attached to the base panel by a living hinge.

4. The shower curtain clip of claim 3, wherein the base panel, retaining panel and living hinge are integrally formed of a polymeric material.

5. The shower curtain clip of claim 1, wherein the base panel has a thickness T and a width W, and a ratio of T:W is from 0.1:to 0.3:1.

6. The shower curtain clip of claim 5, wherein the curtain-engaging nose defines an arc distance A, and a ratio of A:T is from 0.5:1 to 2:1.

7. The shower curtain clip of claim 1, wherein the base panel is double walled.

8. The shower curtain clip of claim 1, wherein the base panel comprises a rear wall, a front wall, and an open channel between the rear and front walls.

9. The shower curtain clip of claim 1, wherein the curtain-engaging nose surface and the curtain-engaging inner surface are cylindrical shaped.

10. The shower curtain clip of claim 9, wherein the snap edge presses against and is deformed by the cylindrical nose surface when the retaining panel is pivoted from an open position to the closed position.

* * * * *